(12) United States Patent
Conti et al.

(10) Patent No.: US 10,387,645 B2
(45) Date of Patent: Aug. 20, 2019

(54) METHOD FOR RECOGNIZING IF A USER OF AN ELECTRONIC TERMINAL IS A HUMAN OR A ROBOT

(71) Applicant: Universita' Degli Studi Di Padova, Padua (PD) (IT)

(72) Inventors: Mauro Conti, Padua (IT); Claudio Guarisco, Padua (IT); Riccardo Spolaor, Padua (IT)

(73) Assignee: UNIVERSITA' DEGLI STUDI DI PADOVA, Padua (PD) (IT)

( * ) Notice: Subject to any disclaimer, the term of this patent is extended or adjusted under 35 U.S.C. 154(b) by 71 days.

(21) Appl. No.: 15/535,390

(22) PCT Filed: Dec. 10, 2015

(86) PCT No.: PCT/IB2015/059514
§ 371 (c)(1),
(2) Date: Jun. 12, 2017

(87) PCT Pub. No.: WO2016/092502
PCT Pub. Date: Jun. 16, 2016

(65) Prior Publication Data
US 2017/0337373 A1    Nov. 23, 2017

(30) Foreign Application Priority Data
Dec. 10, 2014  (IT) ............................... MI2014A2112

(51) Int. Cl.
*G06F 21/55* (2013.01)
*G06F 21/36* (2013.01)

(52) U.S. Cl.
CPC ............ *G06F 21/55* (2013.01); *G06F 21/554* (2013.01); *G06F 21/36* (2013.01); *G06F 2221/2133* (2013.01)

(58) Field of Classification Search
CPC ........ G06F 21/55; G06F 21/554; G06F 21/36; G06F 2221/2133
See application file for complete search history.

(56) References Cited

U.S. PATENT DOCUMENTS

| | | | | |
|---|---|---|---|---|
| 8,671,058 B1 * | 3/2014 | Isaacs | ..................... | G06F 21/36 382/100 |
| 2010/0306055 A1 * | 12/2010 | Kolb | ..................... | G06Q 30/02 705/14.55 |

(Continued)

OTHER PUBLICATIONS

Notification of Transmittal of the International Search Report and the Written Opinion of the International Searching Authority for PCT/IB2015/059514 dated Mar. 11, 2016.

(Continued)

*Primary Examiner* — Nelson Giddins
(74) *Attorney, Agent, or Firm* — Hedman & Costigan, P.C.; James V. Costigan; Kathleen A. Costigan

(57) ABSTRACT

A method to recognize whether a user of an electronic terminal is a human or a robot is described. This method provides to take an image and decompose the image in a multitude of image portions. The image portions are randomly visualized inside a test area of an electronic terminal. The method provides to detect the movement of a cursor inside the test area, and to move each image portion inside the test area according to a trajectory which depends on the position of the cursor inside the test area. When the cursor is in a solution position inside the test area, the image portions combine into the original image. The coordinates of the solution position are randomly generated, and to these coordinates is associated a solution area which comprises the coordinates of the solution position. In order to recognize if a user of an electronic terminal is a human or a robot, the method tests if the cursor position is inside the solution area when the user inputs a control signal.

16 Claims, 6 Drawing Sheets

(56) References Cited

U.S. PATENT DOCUMENTS

| | | | | |
|---|---|---|---|---|
| 2011/0208716 | A1* | 8/2011 | Liu | G06F 21/36 707/710 |
| 2012/0167204 | A1* | 6/2012 | Akka | G06F 21/36 726/22 |
| 2012/0272302 | A1* | 10/2012 | Zhu | G06F 21/36 726/6 |
| 2013/0031640 | A1* | 1/2013 | Fisk | G06F 21/36 726/28 |
| 2013/0097697 | A1* | 4/2013 | Zhu | G06F 21/31 726/18 |
| 2013/0251212 | A1* | 9/2013 | Leddy | G06F 21/36 382/115 |
| 2014/0143858 | A1* | 5/2014 | Brixel | G06F 21/36 726/19 |
| 2014/0258872 | A1* | 9/2014 | Spracklen | H04L 41/5067 715/736 |
| 2014/0366124 | A1* | 12/2014 | Takehara | G06F 21/31 726/16 |
| 2015/0143495 | A1* | 5/2015 | Okada | G06F 21/31 726/7 |
| 2015/0271166 | A1* | 9/2015 | Paxton | G06F 21/316 726/2 |
| 2015/0301724 | A1* | 10/2015 | Thibadeau, Sr. | G06F 3/04842 706/12 |
| 2016/0261586 | A1* | 9/2016 | Huang | G06T 11/60 |

OTHER PUBLICATIONS

Thomas Varun Ambrose et al., Cursor CAPTCHA—Implementing CAPTCHA using mouse cursor, Tenth International Conference on Wireless and Opticl Communications Networks, IEEE, Jul. 26, 2013, pp. 1-5.

Lindsay McComb, The hunt for a better Captcha, The Meta Q, Oct. 16, 2012, Retrieved from the Internet on Aug. 18, 2015: URL:http://themetaq.com/articles/better-captchas.

Graeme Baxter Bell, "Strengthening CAPTCHA-based web security". First Monday, vol. 17, No. 2, Feb. 6, 2012, Abstract Section, 4.4.

Haichang Gao et al., "A Novel Image Based CAPTCHA Using Jigsaw Puzzle", Computational Science and Engineering(CSE), 2010 IEEE 13th International Conference on, IEEE, Piscataway, NJ; Dec. 11, 2010, pp. 351-356 Abstract Section III.

Mauro Conti et al., CAPTCHaStar! A novel CAPTCHA based on interactive shape discovery, Retrieved from the Internet: URL:http://arxiv.org/abs/1503.00561; Mar. 2, 2015.

* cited by examiner

201

| Test | ψ | δ | NumOfSol |
|---|---|---|---|
| 1 | 0% | 5 | 1 |
| 2 | 20% | 7 | 1 |
| 3 | 120% | 10 | 1 |
| 4 | 70% | 7 | 1 |
| 5 | 0% | 7 | 3 |
| 6 | 10% | 7 | 2 |
| 7 | 250% | 7 | 1 |
| 8 | 180% | 7 | 1 |

202

| | Test Number | 1 | 2 | 3 | 4 | 5 | 6 | 7 | 8 |
|---|---|---|---|---|---|---|---|---|---|
| | Success Rate | 78.8% | 96.2% | 82.7% | 89.2% | 76.9% | 40.4% | 69.2% | 61.5% |
| Success | Average Time (s) | 23 | 24 | 39 | 27 | 46 | 71 | 44 | 78 |
| | Standard Deviation | 17 | 11 | 36 | 18 | 61 | 41 | 42 | 102 |
| Failure | Average Time (s) | 18 | 26 | 49 | 27 | 47 | 47 | 68 | 52 |
| | Standard Deviation | 8 | 6 | 37 | 13 | 33 | 27 | 42 | 29 |

Fig. 2

| Strategy | Execution Time (s) | Success Rate |
|---|---|---|
| MinSize | 10 | 0% |
| MinDistribution | 65 | 0.07% |
| MinSumDist | 765 | 0.5% |
| AllSumDist | 1500 | 1.92% |

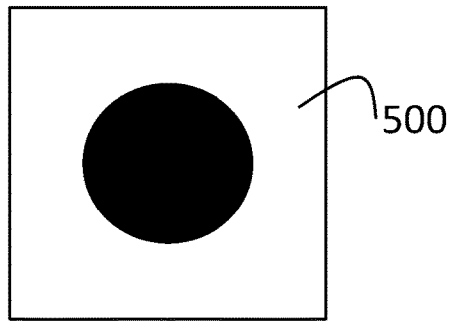
Fig. 5a
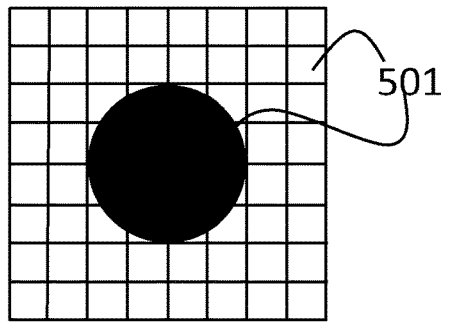
Fig. 5b
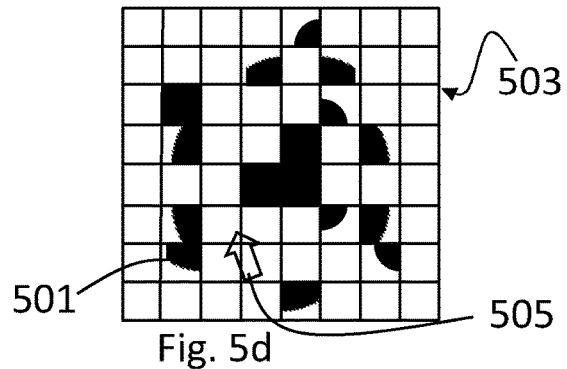
Fig. 5d
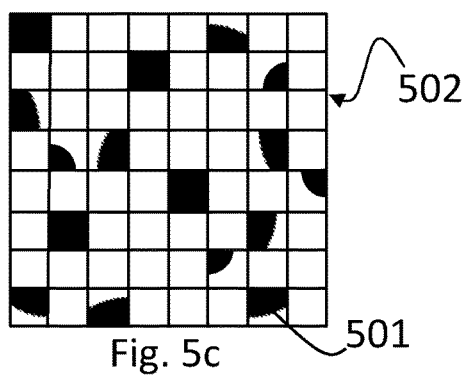
Fig. 5c
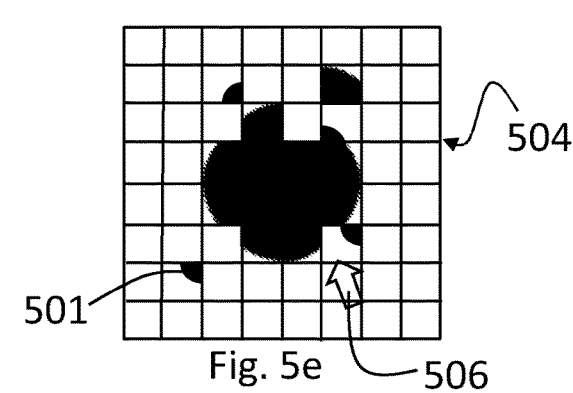
Fig. 5e
Fig. 5

METHOD FOR RECOGNIZING IF A USER OF AN ELECTRONIC TERMINAL IS A HUMAN OR A ROBOT

TECHNICAL FIELD

This invention refers to computerized methods to recognize if the user of an electronic terminal is a human or an automatized program, in particular a robot.

STATE OF THE ART

Nowadays lots of public services on the web are subject to automated attacks, i.e. attacks by automatic programs which can exploit the vulnerabilities of an on-line service by pretending to be human users. An example of such an attack is the automated creation of accounts on an electronic mail provider in order to use it to send advertisements on a large scale via electronic mails or similar systems (spam). Other examples of automatized attacks are able to compromise the security of a website through the injection of malicious code or to access to private information, or, again, to manipulate the voting system into a website. In order to protect to these and other threats, on the last years an increasing number of websites adopted countermeasures against these attacks, in order to block or strongly hinder access from robots to their contents. One of the most common methods consists in allowing access to a service only to users able to solve a CAPTCHA (i.e., Completely Automated Public Turing test to Tell Computers and Humans Apart). The main goal of a CAPTCHA is to discern if the user of an electronic terminal is a human or a robot. In order to do this, researchers leverage the gap between human abilities and state-of-the-art software, including artificial intelligence techniques. A CAPTCHA is a method implemented by a computer program, able to generate a test that is easily solvable by humans, but really hard for a machine (at least without employing a significant amount of time and resources). For instance, automatic programs can not easily understand the meaning of a phrase (or a picture), while humans can perform this task with negligible effort. CAPTCHAs can be divided in two main categories, according to the required ability used to solve them: text-based tests, if they require the recognition of alphanumeric characters, and image-based tests, when the user is challenged to recognize pictures. Text-based CAPTCHAs require the user to rewrite, in a specific input form, an alphanumeric string visualized as a cluttered and/or distorted picture on the display of the electronic terminal. Often, in order to help visually impaired people or people with disabilities, in addition to the picture an audio component is present. After the solution is submitted, a server-side program verifies the correctness of the submitted code. A recent and popular type of text-based CAPTCHA is iCaptcha: it measures and analyzes the interactions that the user performs with the test while the user is solving the challenge. Infact, iCaptcha prompts the user with a obfuscated word and a button for each letter that is obfuscated too; so the user must compose the answer pushing the buttons on the display in the correct order, instead of entering the answer using the keyboard. iCaptcha verification operates on two fronts: firstly, the correctness of the answer discriminates a human from a machine. Secondly, the interleaving time after the tap of each button discriminates a legitimate user from an external paid human. However, we consider this type of discrimination weak, because the latency of the network connection can heavily affect the measurement of the interleaving times. Moreover, iCaptcha presents to the user a small set of candidate characters (i.e., the set of buttons) that composes the solution of the challenge. Unfortunately, while this feature improves usability, it also increases the success rate of attacks that leverages OCR software (Object Character Recognition). Image-based CAPTCHAs usually ask the user to recognize an image or to manipulate objects to find a solution. Unlike text-based CAPTCHAs, every image-based design is substantially different from every other. For this reason, a user who faces a design for the first time needs a little more effort to understand its rules. Studies suggest that image-based CAPTCHAs are more appreciated by users, as reported in "A novel image based captcha using jigsaw puzzle," in Computational Science and Engineering. Indeed they have a really high success rate and they are less challenging than text-based ones. Image-based CAPTCHAs can be divided into three categories: one that presents pictures that need to be recognized (Asirra) or sorted (Deep captcha) according to a proposed rule, one that asks to recognize a movement in a video (Motion captcha) and the interactive kind of CAPTCHA, that (for example) asks to compose a puzzle using the picture proposed (Jigsaw captcha). Even if image-based CAPTCHAs are different from each other, and ease of use can change according to the considered type, they do not need to have their solution typed on a keyboard. For this reason users, in particular smartphone and tablet users, prefer them over text-based CAPTCHAs. However, inventors detected that current image-based CAPTCHAs require external libraries, large memory space, and can require a large amount of processor power to generate a single challenge (for example, in some cases they require more than two minutes to generate a single challenge). Moreover these types of CAPTCHA have many weaknesses: some (in particular the ones based on games) hide the solution on the local client and not on the server side, so a robot that performs an indirect attack is able to easily retrieve the solution of the test; some other typologies are based on a set of pre-generated challenges that are memorized in a database, so an attack is able to perform the exhaustion of the database using, for instance, real human labor to solve them (e.g., Amazon Mechanical Turk); all types of image-based CAPTCHAs are vulnerable to Machine Learning techniques (for instance, SVM) that, if implemented in an automatic program, can recognize objects presented in a challenge and solve it; some typologies simply do not have a sufficient number of possible answers, so an attacker can simply rely on random chance and reach a decent success rate.

OBJECTS AND SUMMARY OF THE INVENTION

The object of this invention is to overcome the drawbacks of the state of the art.

In particular it is an object of this invention is to present a method that allows to improve the ease of usability of a test for recognizing if the user of an electronic terminal is a human or a robot.

It is also an object of this invention to present a method that allows to improve the level of security of a test that recognizes if the user of an electronic terminal is a human or a robot.

Another object of this invention is to present a method that allows to improve the efficiency of a test that recognizes if the user of an electronic terminal is a human or a robot.

These and other objects of this invention are reached using a method that includes features of the attached claims, that are part of this description.

The method provides to take an image and decompose it in a multitude of image portions. Then, the method provides to visualize said multitude of image portions, placing them randomly inside a test area of the display of an electronic terminal, and generating randomly the coordinates of a solution position inside the test area. Indeed, we define as solution area the area that includes the coordinates of the solution position. In a subsequent phase, the method detects the movement of the cursor and it moves each image portion inside the test area, according to a trajectory that depends to the detected position of the cursor. The trajectory is such that, when the cursor is in the solution position, the original image is shown inside the test area. Moreover, the method provides to detect a control signal inputted by the user of the electronic terminal and the detection of the position of the cursor at the moment of the submission of the control signal. If the cursor is inside the solution area at the moment of the control signal, then the interaction with the electronic terminal is considered performed by an human.

This test results easier to use than other traditional tests because it does not require the resolution of problems (e.g., composition of a puzzle like in Jigsaw captcha) or the deciphering of alphanumeric distorted strings, barely visible on small sized screens.

The usability of the method is significantly emphasized on smartphones and tablets, where the cursor is moved by simply dragging the finger over the screen.

In one embodiment, the original image is obtained by altering a base image composed of a base matrix of pixels. The alteration of the base image is performed in the following phases:
  dividing the base matrix of pixels in a multitude of base sub-matrices;
  associating to each base sub-matrix a corresponding altered sub-matrix.

The altered sub-matrix is selected among a finite number of sub-matrices in function of the distribution of pixel values in the base sub-matrix.

In particular, each altered sub-matrix is visualized on a display as black or a geometric shape.

This solution allows to reduce the computational cost of the algorithm, because it can reduce the details of the original image.

In one embodiment, the original image is obtained by altering a base image which includes a base matrix of pixels. The alteration of the base image is performed following these phases:
  a) dividing the base matrix of pixels into a multitude of base sub-matrices;
  b) associating to each base sub-matrix a correspondent altered sub-matrix, said altered sub-matrix such that its visualization on the display is a black image or an image of a geometric shape;
  c) computing the number of altered sub-matrices related to geometric shapes;
  d) comparing the computed number with a predefined noise parameter,
  e) replacing altered sub-matrices produced by a black image with altered sub-matrices produced by geometric shapes, in order to carry out this comparison.

This solution allows to tune the degree of obfuscation of the image in order to make the method difficult to be attacked by a robot.

In a suggested embodiment, the original image is an intelligible image or that its shape is recognizable by the human mind. This allows a human user to understand when to input the control signal to indicate to the electronic terminal the condition of test that the interaction with it is performed by an human.

In one embodiment, the proposed method can run in an electronic terminal that is a client terminal of a computer network, and the coordinates of the solution position are generated and stored into a server of the computer network. In this way, an indirect attack against the test is not feasible, because all the information about the solution are not available on the client terminal.

Such solution increases the security level of a test to recognize if a user of an electronic terminal is an human or a robot.

In one embodiment, the proposed method provides that the original image which is an intelligible shape, is obtained altering a base image that includes a base matrix of pixels which is divided into a multitude of base sub-matrices and it is associated to each one of these base sub-matrices an altered sub-matrix, which is selected among a finite number of predefined sub-matrices such that each altered sub-matrix visualized in the display is a black image or a geometric shape. In this way an attack, in order to find the distribution that represents an intelligible shape, is forced to solve the test. This solution increases the security level of a test because it require a constant interaction with the test itself, increasing the amount of computational resources needed by a robot to solve in an automated way the test adopting the proposed method, so decreasing the success rate of an automated attacks, as showed by the experimental investigation reported in the detailed description of the invention.

In one alternative embodiment, the method provides that the original image is selected in a database of images, and the database is updated by a computer program that retrieves automatically images from the Internet network. This solution increases the efficiency of the method because on one side it decreases the success rate of attacks that aim to exhaust all the possible tests in the database.

The invention also regards a computer program which includes portions of code that, when they are executed in a computer, allow to execute one of the methods described in the previous description and better specified in the attached claims.

Further beneficial features of this invention will be made more clear from the following description and from the attached claims, which are an integral part of this invention.

BRIEF DESCRIPTION OF THE DRAWINGS

In what follows, the invention is described with reference to non-limiting examples, provided for explanatory purposes and not limited to the examples in the attached drawings. These drawings illustrate different aspects and embodiments of this invention and, when needed, reference numbers to structures, components, materials and/or similar elements in different figures are noted with similar reference numbers.

FIG. 2 shows parameters and results of experimental investigations performed to assess the usability of the proposed method.

FIG. 5 shows images that are acquired, processed and/or visualized during the method reported in FIG. 1.

DETAILED DESCRIPTION OF THE INVENTION

While the invention is susceptible to various changes and alternative constructions, some non-limitative embodiments, provided for explanatory purposes, are described in the following.

However, it must to be understood that there are not any intentions to limit the invention in its specific illustrated embodiment but, on the contrary, the invention aims to cover all the possible changes, alternative constructions and equivalent that fall within the scope of the invention as defined in the claims.

In the following description, the use of "for example", "etc.", or "or" points to not exclusive alternatives without any limitation, unless stated otherwise; the use of "also" and "too" means "with, but not limited to", unless stated otherwise; the use of "includes/comprehends" means "includes/comprehends, but not limited to", unless stated otherwise.

The term computer is meant to refer to any electronic terminal which is able to elaborate data. According with this invention, the term computer includes personal computers, cellular phones, smartphones, tablets, laptops, portable computers, etc.

With the term "Noise" it is meant to refer to the percentage of geometric shapes added to the test area, computed according to the number of geometrical shapes generated by a sampling algorithm.

With the term "PicSize" it is meant to refer to a parameter which limit the maximum value of width and height of a sampled image.

With the term "Rotation" it is meant to refer to a Boolean parameter which indicates if the selected image is rotated by a random angle.

Figure 1:
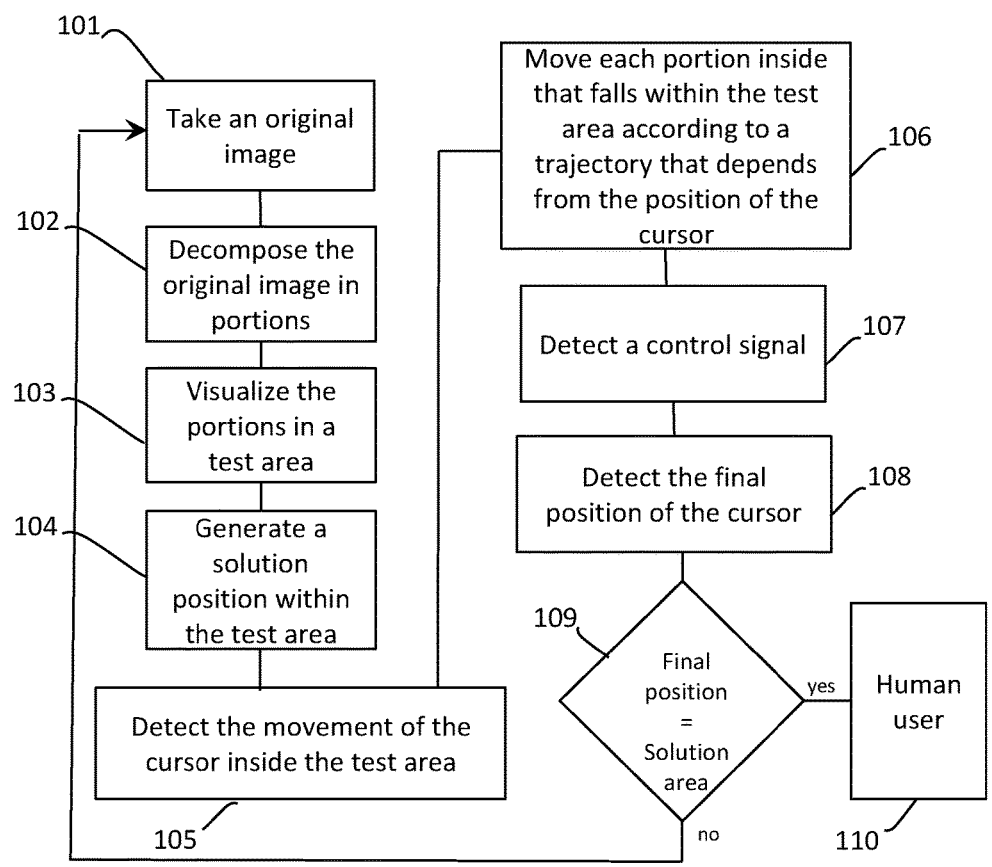
FIG. 1 shows a flow diagram of the method according to one embodiment of the invention.

With the term "Sensibility" it is meant to refer to a parameter which indicates the intensity of dislocation of each geometric shape with respect to the cursor movement FIG. 1 shows a flow diagram of the method according to a suggested embodiment of the invention. This invention is a method implemented by a software program to recognize if the user of an electronic terminal is a human or a robot. This method provides to take (step 101) an image (in what follows named original image) and, possibly, resize that image according to the chosen value of the PicSize parameter. The resized image can also be rotated by applying the Rotation parameter if this function is enabled.

The original image is selected from a multitude of images stored in a database of images in Portable Network Graphics (PNG) format. The PNG format is particularly useful because it is the most used standard for computer-generated images on the Internet network, provided with an alpha channel (i.e., transparency) and compressed without losing information (lossless) As an example, FIG. 5 reports an example of an image composed of a white rectangle with a black circle in the center, which is taken as the original image in the example described in what follows.

Preferably, then, the method provides to update the database automatically by retrieving images from the Internet network.

Figure 6:
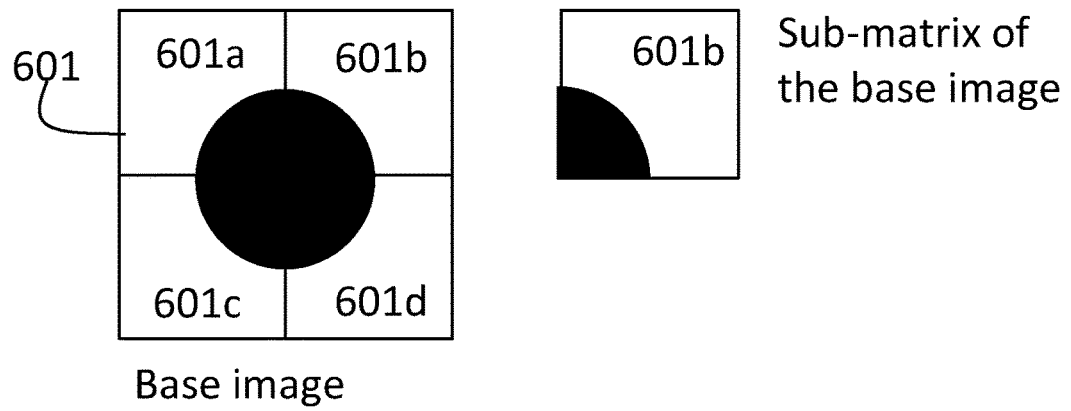
FIG. 6 shows a method to obtain an intelligible image by altering a base image to be used in the method reported in FIG. 1.
Figure 6:
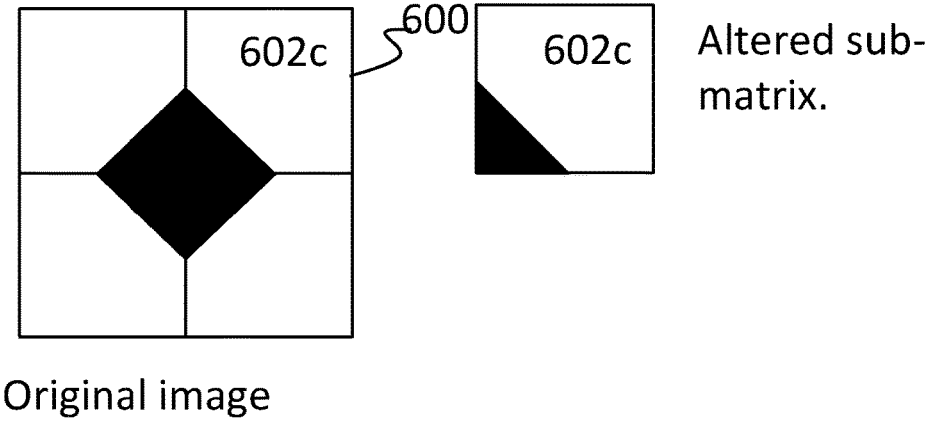

In one alternative embodiment, illustrated in FIG. 6, the original image 600 is not taken from a database of images, but it is an intelligible image obtained by altering a base image 601, for example a PNG image which in the non-limitative example in FIG. 6 is a white rectangle with a black circle in the center.

In a manner known, the base image 601 includes a base matrix of pixels and it is altered by dividing the base matrix of pixels in a multitude of base sub-matrices. (601*a*, 601*b*, 601*c*, 601*d*). Subsequently, it is associates with each base sub-matrix a corresponding altered sub-matrix (602C) selected among a finite number of predefined sub-matrices. The association of a sub-matrix with a altered predefined sub-matrix occurs in function of the distribution of the pixel values in the base sub-matrix.

Advantageously, the predefined sub-matrices are such that, when visualized in a display, they generate a black image or an image of a geometric shape.

In practice, in this embodiment, the method starts from a base image and replaces it, by altering its portions, with a stylized image obtained by the combination of a limited number of geometrical figures. Preferably, it is possible to use geometric shapes, such as a star, and a black image. In the example in FIG. 6, the used geometric shape is a triangle.

Advantageously, then, the method generates additional geometric shapes that fulfill the function of noise when they are added to the test area. This feature is obtained by calculating the number of altered sub-matrices that generated the image of a geometric shape. Later, the method compares the calculated number according to the predefined value of the Noise parameter and replaces the altered sub-matrices associated to a black image, randomly selected within a test area, with altered sub-matrices associated with images of geometric shapes in function of such comparison. Even in this alternative embodiment, it is also possible to provide the rotation of the base image, along with all the possible alterations that may be made to the base image.

Going back to FIG. 1, at this point the method provides to decompose (step 102) the original image 500 (whether taken from a database of images or obtained by altering another base image, as described when referring to FIG. 6) in a multitude of image portions 501, as illustrated in FIG. 5*d*.

The different image portions are visualized (step 103) within a test area of the display of the electronic terminal, arranging them in a random way. The result is a distorted image 502, as illustrated in FIG. 5*c*.

Subsequently, the method provides to randomly generate (step 104) the coordinates of a solution position inside the test area, and defines a solution area inside the test zone, in which are included the coordinates of the solution position. The coordinates of the solution position ($sol_x$, $sol_y$) are preferably generated with an offset with respect to the coordinates of the perimeter of the test area, in such a way to ensure that the solution position is not on the edge of the test area.

In one embodiment, these coordinates are generated and stored in a server, so that those coordinates are not accessible to the client electronic terminal.

Once the method visualized the distorted image on the display of an electronic terminal, and generated the coordinates of the solution position, the method provides to detect (step 105) the movement of a cursor within the test area. The cursor can be of any type, for example a pointer of a mouse, a pointer of an optic pen, the result of the pressure of a finger on a touch screen.

According to the movement of the cursor (in FIG. 5, the cursor is represented by a white arrow and indicated with the references 505 and 506) in the test area, the method provides to move (step 106) each image portion inside the test area, which generates the different images 503 and 504, as reported by FIGS. 5d and 5e that show the evolution of the distorted image 502 when the cursor gets more and more close to the solution position, as described in what follows. This movement occurs following a trajectory computed through four coefficients ($m_{xx}^i$, $m_{xy}^i$, $m_{yx}^i$, $m_{yy}^i$) that define the trajectory of each one of the image portions that fall within the test area and these trajectories are dependent to the coordinates of the position of the cursor that moves inside the test area. The value of the four coefficients is computed according to the value of the Sensibility parameter. In particular, the values of the four coefficients is randomly selected within an interval computed according to the value of the Sensibility parameter. For example, such interval could range between −sensibility/10 and +sensibility/10 included.

The method defines the coordinates ($P_x^i$, $P_y^i$) for each image portion when the cursor is placed in the solution position, in such way that, when the cursor is in the solution position, it is visualized the original image inside the test area. The method further computes the coordinates of a constant ($C_x^i$, $C_y^i$) for each image portion, with respect to the initial distribution of the image portions, according to the following formulas:

$$C_x^i = P_x^i - \text{sol}_x \cdot m_{xx}^i - \text{sol}_y \cdot m_{xy}^i$$

$$C_y^i = P_y^i - \text{sol}_x \cdot m_{yx}^i - \text{sol}_y \cdot m_{yy}^i$$

Since the client terminal that runs the program implemented by this method provides to use the parameters described above for each image portion, in order to calculate the position of each image portions in the test area the method provides that a script running on the server terminal to return to the client terminal a row for each image portion.

Thus, the client terminal receives from the server terminal the following values for each image portion: $m_{xx}^i$, $m_{xy}^i$, $C_x^i$, $m_{yx}^i$, $m_{yy}^i$, $C_y^i$.

In the subsequent phase, a script running on the client terminal analyses each row sent by the script running on the server terminal and stores that information into a data structure. The method provides to sense a control signal 107 inputted by the user of the electronic terminal.

In one embodiment, the control signal is generated by the pressure of a mouse button or through the tapping of a display of an electronic terminal sensitive to touch; alternatively the control signal can be generated by other interfaces, for example, the keyboard, the voice, the movement of parts of the user's body (detectable with suitable devices external to the user such as Microsoft Kinect®, or mobile devices attached, held or worn by the user and equipped with motion sensors), the movement of the eye (detectable with eye tracking devices) and brain activity (detectable by brain-computer Interfaces) or other interactions through human-computer interfaces.

So the method detects the final position of the cursor (step 108), where the final position is the position of the cursor when the user input the control signal. In particular, every time the user moves the cursor during the test, the method provides to use the coordinates of the cursor ($\text{cur}_x$, $\text{cur}_y$) in the test area and uses them to compute, moment by moment, the position of each image portion using the following formulas:

$$x^i = m_{xx}^i \cdot \text{cur}_x + m_{xy}^i \cdot \text{cur}_y + C_x^i$$

$$y^i = m_{yy}^i \cdot \text{cur}_y + m_{yx}^i \cdot \text{cur}_x + C_y^i$$

The user stops the movement of the cursor when the user believes that the cursor is in the final position ($\text{cur}_x^f$, $\text{cur}_y^f$) where the user recognizes the distribution of image portions inside the test area to be the original image. So such method provides that when the client terminal detects the final position of the cursor, it transmits the coordinates of the final position of the cursor to the server terminal, which accepts the coordinates of the final position ($\text{cur}_x^f$, $\text{cur}_y^f$). Subsequently, the server terminal compares such coordinates with the coordinates of the solution position ($\text{sol}_x$, $\text{sol}_y$) through a script therein implemented. This comparison occurs by comparing the euclidean distance between the final position and the solution position, and a predetermined threshold of tolerance. If such difference is less than the tolerance threshold, the method considers that the interaction with the electronic terminal is accomplished by a human, and therefore the user has passed the test. Otherwise the user has failed the test and the method provides to generate a new test by repeating the steps 101 to 110. The proposition of a new test by repeating the steps 101 to 110 is to be considered as an example of a possible flow of execution, however, it is not strictly necessary for the purposes of verifying whether the interaction with the electronic terminal is accomplished by a human user or by a robot. For example, in the case of a failed test, in one embodiment it is possible to consider the test concluded as a failure.

From the description reported above, it is clear how the described method allows to reach the proposed objects.

It is then clear, to a technician of the field, that it is possible to apply changes and variations to the described solution with reference to the figures pointed above, without departing from the scope of the present patent as defined by the appended claims.

For example, although the solution has been described with reference to a network with client and server, it is clear that the network may be more complex and the functions, which in the embodiment described above are performed by a server or a client, can be executed by one or more computers that share resources on the network. For example, the server that offers the CAPTCHA test according to the present invention, may keep the images in an archive (database) that resides on a separate computer.

In one alternative embodiment, the method provides a further step of verification, for example by analyzing the movements of the cursor detected in step 105, as described above, and verifying if such movements are compatible with the movements inputted by a human. This verification can be performed using machine learning techniques that exploit a classifier trained using the mouse movement flows collected from human users.

In one alternative embodiment, the method provides to use multiple original images in the same test. In this embodiment, the images, for example relating to objects, things or animals, are decomposed and their parts visualized in random way within the test area. For each image a solution position and a solution area are generated. The solution position is such that, when the cursor is in the solution position the image is resolved, that is: it comes together perfectly in the test area and visualizes the original image. The solution area is an area of the test area which includes the solution position, for example it includes a predefined number of pixels in the neighborhood of the solution position.

In one embodiment, the method also provides to ask questions to the user, for example by visualizing them on a display or reproducing them through a speaker of the electronic terminal on which the test area is visualized. Through those questions the method asks the user some semantic information about the image to find. For example, in a test where the original image represent a car and an animal, depending on the cursor position, a question asked to the user of the electronic terminal may be: "choose the car." Moving the cursor in the test area, the user will, depending on the movement of the user, form the image of a car or an animal. The user must enter the control signal required, for example a click with the left mouse button when the cursor is in the solution position of the image of a car. Pressing the left mouse button when it is visualized the animal, in this embodiment, is considered as incorrect and the test is not considered as passed.

According to further variants to the methods described above, the original image may be an image in more than two dimensions, in particular three-dimensional. Consequently, therefore, the decomposition of this multidimensional image must be multidimensional and the solution area will be a portion in the multidimensional space, such as a solution volume in three dimensional space. The user interactions in addition to being represented by a cursor (in two dimensions) can have other dimensions, and therefore the trajectories of the image portions of the decomposed image can be moved on more than two dimensions (for example, the image portions may be three-dimensional and rotate into the three dimensions).

Finally, it must be considered that, for the purposes of the present invention, within the test area additional images or graphics can also be visualized, henceforth for brevity referred to as "noise images", which are not part of the original images that are part of the test that are decomposed and moved in relation to the movement of the cursor in the test area. These noise images, which have the function of noise, can be static or dynamic, that means that they may remain stationary or move, as a function of the movement of the cursor in the test area.

Experimental Investigations

In what follows, some experimental results are reported, which show the effectiveness of the proposed method. In particular, several experimental results that investigated firstly on the usability of the method and secondly on the efficiency and security level of the method are reported, simulating attacks from both automated programs that leverage heuristic approaches and from systems based on machine learning techniques.

Usability

A study that involves human users is necessary in order to evaluate the proposed method in terms of success rate, time of completion of the test and ease of use. For this reason, such preliminary studies were conducted involving a sample of human users bound to confidentiality, using a comprehensive set of parameters. it was requested to each user some demographic information: age, level of education, the years spent using the internet and the frequency in the use of Internet. This information was collected in order to assess if the user experience may affect their performance in solving the test conducted by the method proposed. So, it was conducted a survey composed of eight tests slightly different from each other was carried out, asking each user to solve them. Those eight tests were also designed in order to assess the limit of human users solving the test according to the proposed method, setting for each test the values for Noise and Sensibility parameters, shown in Table 201 in FIG. 2. The results of the eight tests are summarized in Table 202 in FIG. 2. For each test that each user has undergone, the following data was recorded: the parameters of the test and its features (i.e., the trajectories of each geometric shape), the distance between the final position inputted by the user and the solution position, the time taken to complete the test and also the cursor movements performed by the user while the user was solving the test. At the end of the eighth test, it was also asked users to rate the difficulty in understanding the proposed method on a scale of 1 to 10, where 1 means easy to understand and 10 hard to understand, resulting in an average value of 3.1, and if they preferred the proposed method rather than a type of recognition test based on text, and possibly provide suggestions. In order to have a wide range of expertise, it was asked to take the survey to users with different social and educational backgrounds, also trying to recreate the natural conditions of use of the proposed method, so avoiding to observe directly the users during the test. Table 202 shows the results of the survey in terms of success rate and average time in seconds to complete each test according to the method described above. As is easily observable, in most cases the average time to fail a test is higher than the average time required to solve it. This result is not true only for test 6, which was the most complex of the series, in which the value obtained was probably determined by a sense of frustration generated in the user that might have randomly confirmed a final position of the cursor just to pass to the next test. Table 202 also shows that the difference between the values of standard deviation in terms of the time taken to solve the test success and fail is quite high. This suggests that the completion time mainly depends on the personal skills of the users. It is worth noticing that in test 2 and test 4 of Table 202, the average success rate is close to 90%, which is higher than the average value of 84% found in the majority of tests that use a text-based approach to recognize if a user is a human or a robot, as reported in "How good are humans at solving captchas? a large scale evaluation," in IEEE Symposium on Security and Privacy (S&P), 2010.

Efficiency and Security Level i. Resiliency of the Method Against Attacks Based on Heuristic Approaches.

A study to assess in depth the reliability of the proposed method was carried out, creating ad-hoc programs that generate every possible configuration of distribution of geometric shapes inside the test area while solving a test with the proposed method, assigning to every possible configuration a score. Indeed, although recovering all the possible distributions of the geometric shapes obtainable during a test is a trivial task (an attack may simply take a still picture of the test area for each position of the cursor which falls within it), identifying, relying on an automated program, the distribution that might correspond to the original image and thus the solution position of the cursor in the test is not simple at all. In these attack simulations, it was considered as a candidate solution the configuration that minimizes the score with respect to the heuristics applied. The total number of configurations that the ad-hoc automated programs had to evaluate is equal to 84100 (i.e., $290^2$), this means that the computational cost may be very high. In these simulations the programs and heuristic techniques have been implemented using the C programming language, and for each heuristic the automated program was evaluated in terms of success rate and average execution time for at least 250 tests. The computer used is a Personal Computer with 2.3 GHz Intel Pentium B970 CPU and 4 GB of RAM. Here the four heuristics used in this evaluation are reported:

a) Minimizing the height/width of the geometric shapes (MinSize)
b) Minimizing the spreading of the distribution of the geometric shapes(MinDistribution)
c) Minimizing the sum of distances between clusters of the geometric shapes (MinSumDist)
d) Minimizing the sum of the distances between all the geometric shapes (AllSumDist)

Figure 3:
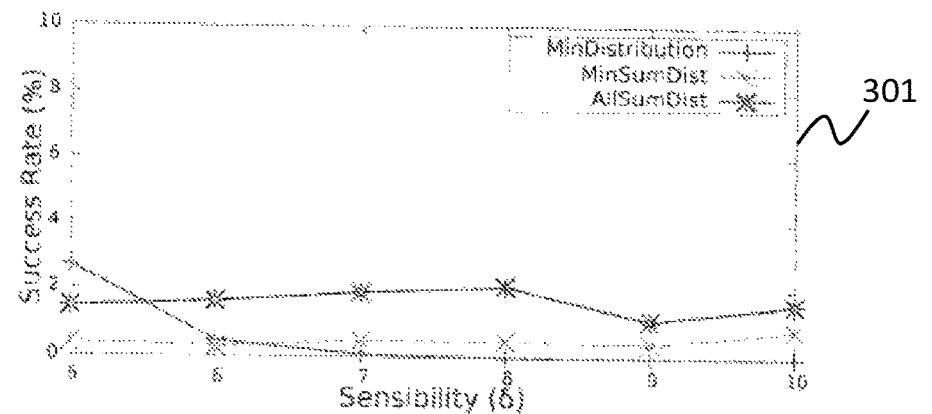
FIG. 3 shows results of experimental investigations performed to assess the security level of the proposed method.
Figure 3:
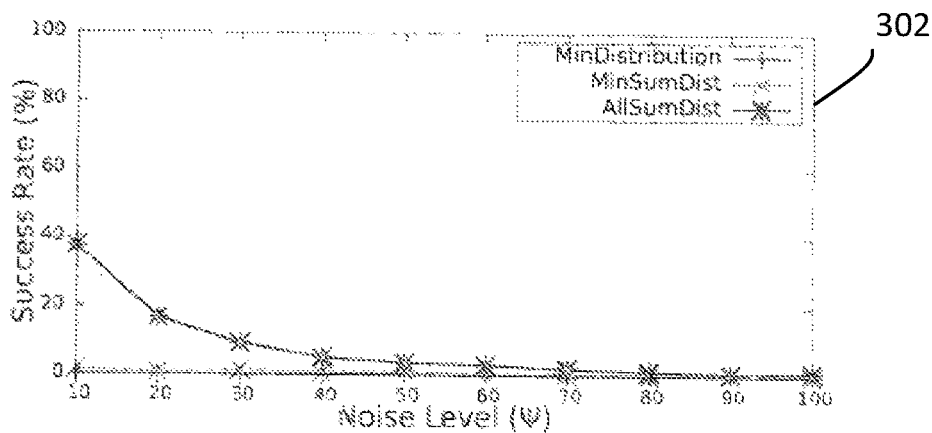

The graphs 301 and 302 in FIG. 3 show the trends of success rates for each heuristics according to the values of the Sensibility and Noise parameters. In Table 303 reported in FIG. 3, the success rate and average execution time to solve a test for each heuristic used are reported, setting the value of Sensibility equal to 7 and the value of Noise equal to 70%. From these results, it is clear that none of the automated attacks based on the above ad-hoc heuristics against the proposed method, were able to obtain a result high enough to compromise the efficiency and the security of the proposed method. In fact, it can be noticed that the highest success rate was obtained by applying the heuristic (AllSumDist), achieving however a very modest value of 1.92%, and an average time of execution of the test higher than 25 minutes, which is indicative of very high computational cost.

ii. Resiliency of the Proposed Method Against Attacks that Leverage Machine Learning Techniques.

Figure 4:
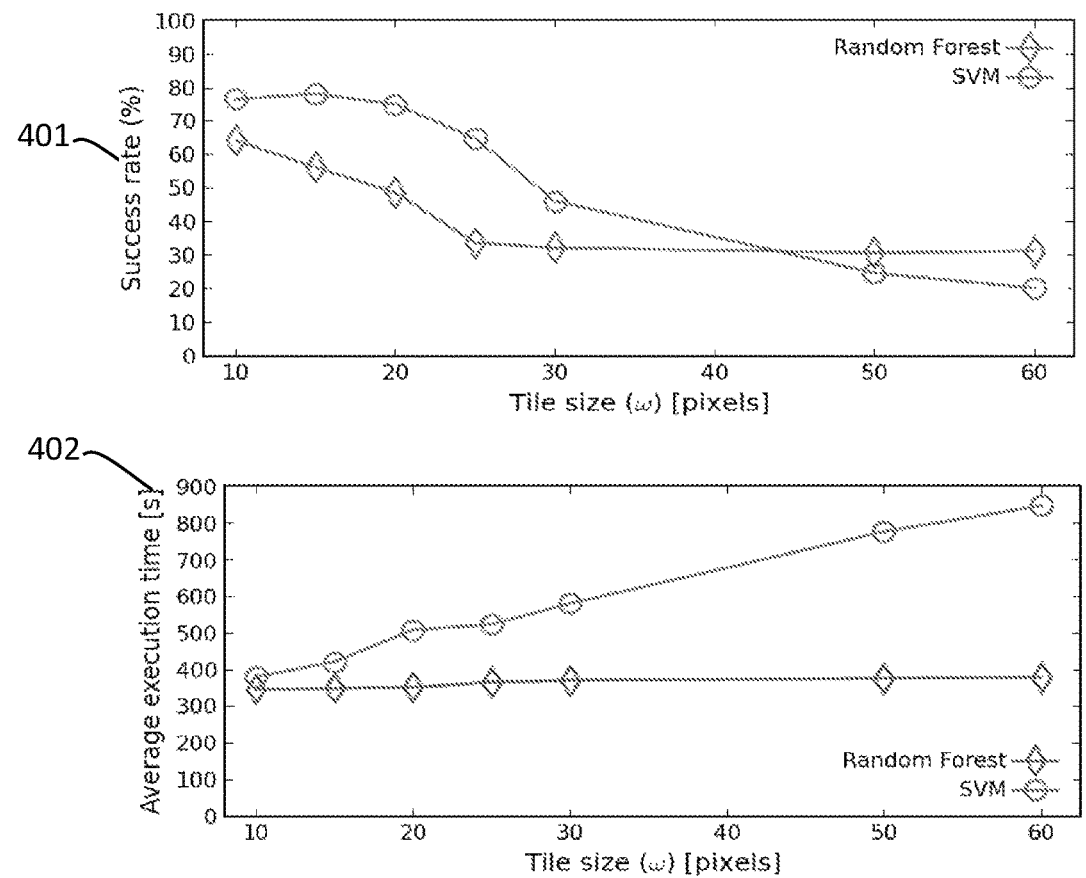
FIG. 4 shows additional results of experimental investigations performed to assess the efficiency and the security level of the proposed method.

In computer science, the machine learning techniques are part of one of the field of artificial intelligence and concern the implementation of systems and algorithms to automatically learn to recognize complex patterns and take intelligent decisions based on observed data. In order to evaluate the efficiency and the security of the proposed method against attacks based on such techniques, a tool was designed using such techniques and then it was used to simulate an attack. In this kind of attack simulation, based on known techniques "Random Forest" and "SVM classifier", the tool returned the results reported in graphs 401 and 402 in FIG. 4. The results compare the performance of the success rate of the attack against the proposed method by the two machine learning classifiers, which performances have been optimized as much as possible through a search space (i.e., all the possible configurations in a test) reduction. Despite the reduction of the search space and running the tests on a high-end PC, further experiments with countermeasures against these attacks (without compromising usability) have achieved a reduction in the attacks success rate to 78%, the resolution time of the test by systems based on the use of machine learning techniques (in any case lower than that obtainable from a human user), for these systems the average execution time is unacceptable, that is more than six minutes to solve each single test. Therefore, even these kinds of attacks have not compromised the efficiency and safety of the proposed method, since it is hard to solve by an automated program even when it uses Machine learning techniques in order to recognize the configuration of geometric shapes in the solution position in the test area that reveals the intelligible form.

The invention claimed is:

1. A method for recognizing when a user of an electronic terminal is a human or a robot, said method comprising the steps of:
    (a) taking an original image,
    (b) decomposing the original image into a plurality of image portions,
    (c) visualizing said plurality of image portions by randomly placing them within a test area of a display of an electronic terminal,
    (d) randomly generating the coordinates of a solution position inside the test area, and defining a solution area that includes the coordinates of the solution position and falls within the test area,
    (e) detecting the movement of a cursor within the test area,
    (f) establishing a control rule according to which any cursor movement in the test area causes a movement moving the plurality of image portions within the test area; wherein the control rule causes that:
        (f1) at any cursor movement in the test area, the plurality of image portions moves assuming a plurality of image configurations according to a plurality of trajectories each associated with a corresponding image portion: depending on the detected cursor position inside the test area,
        (f2) each trajectory is such that, when the cursor is in the solution position, the plurality of image portions forms the original image which is visualized inside the test area,
    (g) moving the cursor within the test area causing the plurality of image portions assuming the plurality of image configurations in accordance with said control rule;
    (h) detecting a control signal inputted by the user of the electronic terminal,
    (i) detecting the final position of the cursor, said final position being the position of the cursor at the time of input of the control signal,
    (j) comparing the coordinates of the final position of the cursor with the solution area, and
    (k) considering the interaction with the electronic terminal as performed by a human when the final position of the cursor falls within the solution area.

2. The method according to claim 1, wherein the original image is obtained by altering a base image, in which a base image comprises a base matrix of pixels, and in which the alteration of the base image is performed in these steps:
    dividing the base matrix of pixels into a plurality of base sub-matrices,
    associating to each base sub-matrix a related altered sub-matrix, in which the altered sub-matrix is selected among a finite number of predefined matrices according to the distribution of values of pixels in the base sub-matrix.

3. The method according to claim 2, wherein each altered sub-matrix is such that its visualization on a display on an electronic terminal is a black image or a geometric shape image.

4. The method according to claim 1, wherein the original image is obtained by altering a base image, in which the base image comprises a base matrix of pixels, and in which the alteration of the base image occurs according to the following steps:
    (a) dividing the base matrix of pixels into a multitude of base sub-matrices,
    (b) associating to each base sub-matrix a related altered sub-matrix, said altered sub-matrix is such that its visualization on a display on an electronic terminal is a black image or a geometric shape image
    (c) calculating the number of altered sub-matrices associated with geometrical shapes,
    (d) comparing the calculated number with a predefined noise parameter, (e) replacing altered sub-matrices associated with a black image with altered sub-matrices associated with a geometrical shapes according to such comparison.

5. The method according to claim 4, wherein the altered sub-matrices, associated to a black image, are randomly selected to replace the step e).

6. The method according to claim 1, wherein the original image is an intelligible image.

7. The method according to claim 1, wherein the electronic terminal is a client terminal of a computer network, wherein the coordinates of the solution position are generated by a server of the computer network and wherein the coordinates of the solution position are stored in a memory area that is not accessible by the client terminal.

8. The method according to claim 7, wherein the server terminal decomposes the original image in a plurality of image portions, and transmits to the client terminal the image to visualize, the image to be visualized includes the image portions of such plurality of image portions randomly switching their position, in which the client terminal visualizes the image to be visualized, the client terminal detects the movement of a cursor within the test area, processes the image to be visualized so as to move each portion of said plurality of image portions within the test area according to said trajectory, detects the control signal and the final position of the cursor, transmits the final position of the cursor to the server, and wherein the server terminal compares the coordinates of the final position of the cursor with the solution area.

9. The method according to claim 1, further including:
taking a second original image,
decomposing the second original image into a plurality of second image portions,
visualizing such plurality of second image portions by randomly placing them within the test area along with the image portions of the original image,
randomly generating the coordinates for a second solution position within the test area, and define a second solution area inside the test area , said second solution area includes the coordinates of the second solution position,
moving each second image portion of such plurality of second image portions within the test area according to a trajectory which depends to the detected cursor position inside the test area, said trajectory is such that, when the cursor is in the second solution position, the second original image is visualized inside the test area
prompting the user of the electronic terminal at least one question which asks the user to choose one of the original images,
considering the interaction with the electronic terminal as performed by a human user when the final position of the cursor falls within the solution area.

10. The method according to claim 1, wherein a control phase is included, wherein the movements of the cursor are analyzed and it is assessed whether those movements match with movements of a cursor when inputted by a human being.

11. The method according to claim 1, wherein noise images are visualized inside the test area, and wherein the positions of such noise images stay unchanged as the position of the cursor varies.

12. The method according to claim 1, wherein noise images are visualized inside the test area, and wherein the positions of such noise images change as the detected position of the cursor varies.

13. The method according to claim 1, wherein the original image is selected from a database of images and wherein the method updates the database automatically by retrieving the images from the Internet network.

14. The method according to claim 13, wherein the database of images contains images in the Portable Network Graphics format.

15. Method according to claim 1, wherein the control signal is generated by a method included in the group consisting of: pressing a button of a mouse, tapping on a display of an electronic terminal sensitive to touch, pressing a button via keyboard, voice command, displacement of parts of the body of the user, gaze shift.

16. Computer program comprising portions of code such that, when run on a computer, allow to perform the method according to claim 1.

* * * * *